(12) United States Patent
Peuker

(10) Patent No.: US 8,906,142 B2
(45) Date of Patent: Dec. 9, 2014

(54) PHASE SEPARATION OF A MULTIPHASE MIXTURE

(75) Inventor: Urs Peuker, Freiberg (DE)

(73) Assignee: Siemens Aktiengesellschaft, Munich (DE)

( * ) Notice: Subject to any disclaimer, the term of this patent is extended or adjusted under 35 U.S.C. 154(b) by 285 days.

(21) Appl. No.: 13/561,944

(22) Filed: Jul. 30, 2012

(65) Prior Publication Data

US 2013/0025451 A1      Jan. 31, 2013

(30) Foreign Application Priority Data

Jul. 28, 2011   (EP) .................................... 11175812

(51) Int. Cl.
*B01D 19/00*   (2006.01)
*B01D 17/02*   (2006.01)

(52) U.S. Cl.
CPC ........ *B01D 17/0217* (2013.01); *B01D 19/0057* (2013.01)
USPC ................... 95/253; 95/261; 96/210; 96/195; 96/157; 96/183

(58) Field of Classification Search
CPC ........................ B01D 19/0057; B01D 17/0217
USPC .............. 95/253, 261; 96/210, 195, 157, 183, 96/185, 186
See application file for complete search history.

(56) References Cited

U.S. PATENT DOCUMENTS

| 2,765,867 | A | 10/1956 | Revallier et al. | 96/177 |
| 2,816,490 | A | 12/1957 | Boadway et al. | 96/195 |
| 3,303,895 | A * | 2/1967 | Fontenot | 175/66 |
| 4,094,783 | A | 6/1978 | Jackson | 210/703 |
| 6,348,087 | B1 | 2/2002 | Aslin | 96/210 |
| 2006/0162561 | A1* | 7/2006 | Oglesby | 95/253 |
| 2009/0020467 | A1 | 1/2009 | Parkinson | 210/188 |

FOREIGN PATENT DOCUMENTS

| GB | 2332632 A | 6/1999 | ............. B01D 17/00 |
| GB | 2403440 A | 1/2005 | ............. B01D 17/00 |

OTHER PUBLICATIONS

Peuker, U.A. et al., "Scale Up and Betrieb eines Dampf-Druckfilters im Pilotmaβstab," Chemie Ingenieur Technik, vol. 73, No. 2, 5 pages (with English translation), Aug. 2000.

(Continued)

*Primary Examiner* — Frank Lawrence, Jr.
*Assistant Examiner* — Douglas Theisen
(74) *Attorney, Agent, or Firm* — King & Spalding L.L.P.

(57) ABSTRACT

A device for phase separation of a multiphase mixture with at least one gas and at least two fluid phases may include a vessel including a tangential inlet via which the multiphase mixture is conveyed to the vessel, a tangential gas outlet above the inlet, via which a gas phase of the multiphase mixture separated from the multiphase mixture can be taken out of the vessel, and at least two outlets below the inlet at different vertical heights, via which one of the at least two fluid phases of the multiphase mixture respectively separated from the multiphase mixture can be taken out of the vessel. Further, a method for phase separation of a multiphase mixture using such device may include imparting an upwards-directed eddy flow to the multiphase mixture, during which fluid droplets are separated from the multiphase gas mixture, collecting the fluid droplets, and separately removing all phases formed.

20 Claims, 2 Drawing Sheets

(56) References Cited

OTHER PUBLICATIONS

Peuker, U.A. et al., "Scale-Up of Steam Pressure Filtration of Mineral Products," Institute of Mechanical Process Engineering and Applied Mechanics, University of Karlsruhe, Germany, 8 pages, Oct. 2000.

Peuker, U.A. et al., "Steam Pressure Filtration Mechanical-Thermal Dewatering Process," Drying Technology, 19(5), 42 pages, 2001.

Peuker, U.A. "Abtrennung von Organischen Lösemetteln aus Filterkuchen mit Dampf," F&S Filtrieren and Separieren, No. 5, 7 pages (with English translation), Jan. 17, 2003.

Peuker, U.A., "Applying Mechanical-Thermal Filtration Processes for Purification, e.g. Solvent Removal," Proc. Filtech Europe, 9 pages, Oct. 2003.

\* cited by examiner

PHASE SEPARATION OF A MULTIPHASE MIXTURE

CROSS-REFERENCE TO RELATED APPLICATIONS

This application claims priority to EP Patent Application No. 11175812 filed Jul. 28, 2011. The contents of which is incorporated herein by reference in its entirety.

TECHNICAL FIELD

This disclosure relates to a device and a method for phase separation of a multiphase mixture.

BACKGROUND

Multiphase mixtures, i.e., mixtures of different phases, such as fluid and/or gas phases, for example a three-phase mixture of a gas phase and two fluid phases, are known.

For example such a three-phase mixture occurs as a cake-forming, washing and dehumidification filtrate in a continuous (pressure) filtration with simultaneous washing and steam (pressure) filtration there.

Such a continuous steam (pressure) filter apparatus is described for example in "Scale-Up and Betrieb eines Dampf-Druckfilters im Pilotmaßstab" (Scale-up and operation of a steam pressure filter in pilot mode), U. A. Peuker, W. Stahl, Chemie Ingenieur Technik, Vol. 73, No. 2, Pages 64-68 (2001); "Steam Pressure Filtration: Mechanical-Thermal Dewatering Process", U. A. Peuker, W. Stahl, Drying Technology, 19(5), Pages 807-848 (2001); "Scale Up of Steam Pressure Filtration of Mineral Products", U. A. Peuker, W. Stahl, Proc. VIII Int. Proc. Symposium, 16.-18. October 2000, Antalya, Turkey; "Applying mechanical-thermal filtration processes for purification, e.g. solvent removal", U. A. Peuker, Proc. Filtech Europe, 12.-23. October 2003, Düsseldorf, Germany; "Abtrennung von organischen Lösemitteln aus Filterkuchen mit Dampf" (Separation of organic solvents from filter cakes with steam), U. A. Peuker, F & S Filtrieren and Separieren, Volume 17 (2003), No. 5, Pages 230-236.

If the question of simultaneous washing and steam (pressure) filtration by such a continuous steam (pressure) filter apparatus is considered, in which two non-mixable fluids are used, this fluid mixture will also be found again in the filtrate. Sources of non-mixable fluids are parent fluid or parent filtrate, wash fluid and condensate.

It is further to be expected here that a three-phase mixture—from a mixture of the two-phase fluid mixture with a gas phase—will result in a filtrate separation system of the steam (pressure) filter apparatus, where this multiphase mixture is separated again into the individual phases, for example the two fluids and the gas.

Various of such filtrate separation systems are further known in an embodiment as separators for separating filtrates or multiphase mixtures.

Such separators for separating a multiphase mixture of at least two fluid phases and a gas phase are described in GB 2 332 632 A and in US 2009/0020467 A1. These separators each have a central vessel to which the multiphase mixture is conveyed. Within the vessel the different phases of the multiphase mixture are separated and drained off from the vessel via differently positioned drain systems.

A disadvantage of such separators is that to some extent these can only separate the multiphase mixture to be separated inadequately and/or with low purity of the separated phases.

SUMMARY

In one embodiment, a device is provided for phase separation of a multiphase mixture with at least one gas and at least two fluid phases with a vessel, which has a tangential inlet via which the multiphase mixture is able to be conveyed into the vessel, which has a tangential gas outlet located immediately above the inlet, by which a gas phase of the multiphase mixture separated from the multiphase mixture is able to be taken away from the vessel, and which has at least two outlets disposed vertically below the inlet, via which at least one of the two fluid phases of the multiphase mixture separated from the multiphase mixture is able to be taken away from the vessel.

In a further embodiment, the tangential inlet is embodied as a tangential nozzle and/or the gas outlet is embodied as a tangential nozzle. In a further embodiment, the inlet is positioned above the center of the vessel, especially at approximately ⅔ the height of the vessel. In a further embodiment, the inlet is combined with a droplet separator. In a further embodiment, the gas outlet is disposed close to or directly at an upper end of the vessel. In a further embodiment, the gas outlet is combined with a vacuum pump by means of which the gas phase is able to be taken away from the vessel. In a further embodiment, the device is used for phase separation of a multiphase mixture, which has two fluid phases, which two fluid phases are formed by non-mixable, specifically different weights of fluid. In a further embodiment, an outlet for the specifically heavier fluid is positioned in a lower quarter of the vessel, especially an area close to a floor of the vessel, and/or an outlet for the specifically lighter fluid is positioned in a lower half of a fluid layer embodied by the specifically lighter fluid in the vessel, especially in a lower third of this fluid layer.

In a further embodiment, the vessel has a curved floor, especially a torispherical head or deep dished torispherical floor. In a further embodiment, an outlet has a drain pump by the use of which a fluid phase is able to be taken away. In a further embodiment, an outlet is a nozzle extended radially into the vessel, the outlet opening of which especially has a cover. In a further embodiment, the device is used for phase separation of a model three-phase mixture with at least two fluid phases and a gas phase, wherein one of the at least two fluid phases is a fluid consisting of organic solvent and bitumen and/or a further of the at least two fluid phases is a fluid consisting of water and/or the at least one gas phase is air. In a further embodiment, the vessel has measurement sensors for detection of the phase boundary, especially that the vessel has a number of such measurement sensors which are positioned in the area of a minimum, optimum and maximum position of a phase boundary.

In a further embodiment, the device includes a regulation of the draining off of the at least two fluid phases of the separated multiphase mixture from the vessel, especially using regulated drain pumps, wherein during the regulation at least one phase boundary between two phases of the multiphase mixture separated in the vessel is able to be set to and/or held at a predeterminable level. In a further embodiment, the device is used for simultaneous washing and steam filtration of oil sand for phase separation of the cake-forming, washing and dehumidifying filtrate formed in such cases, wherein the cake-forming, washing and dehumidifying filtrate formed in such cases is separated as a multiphase mixture by means of the device for phase separation of a multiphase mixture.

In another embodiment, a method is provided for phase separation of a multiphase mixture with at least one gas and at least two fluid phases using any of the devices disclosed above, in which an upwards-directed eddy flow is imparted to the multiphase mixture, wherein during the throughflow of upwards-directed eddies of the eddy flow fluid droplets are separated out from the multiphase gas mixture and when this is done the separated gas phase of the multiphase mixture is formed, in which the fluid droplets are collected, wherein a first and a second fluid phase form in the collected fluid droplets under the influence of gravity, and in which all phases formed are taken away separated from one another, through which the multiphase mixture is separated.

In a further embodiment, the method is used for phase separation of a filtrate from a drum, disk, pan or band filter or from another continuous filter, especially from a steam filter. In a further embodiment, the method is used for phase separation of a cake-forming, washing and dehumidifying filtrate in a continuous steam filter apparatus. In a further embodiment, the method is used for phase separation of a filtrate with at least one gas phase, especially containing air, and at least one first, specifically heavier fluid phase, especially containing water, and a second, specifically lighter fluid phase especially containing an organic solvent and bitumen.

BRIEF DESCRIPTION OF THE DRAWINGS

Example embodiments will be explained in more detail below with reference to figures, in which.

DETAILED DESCRIPTION

Figure 1:
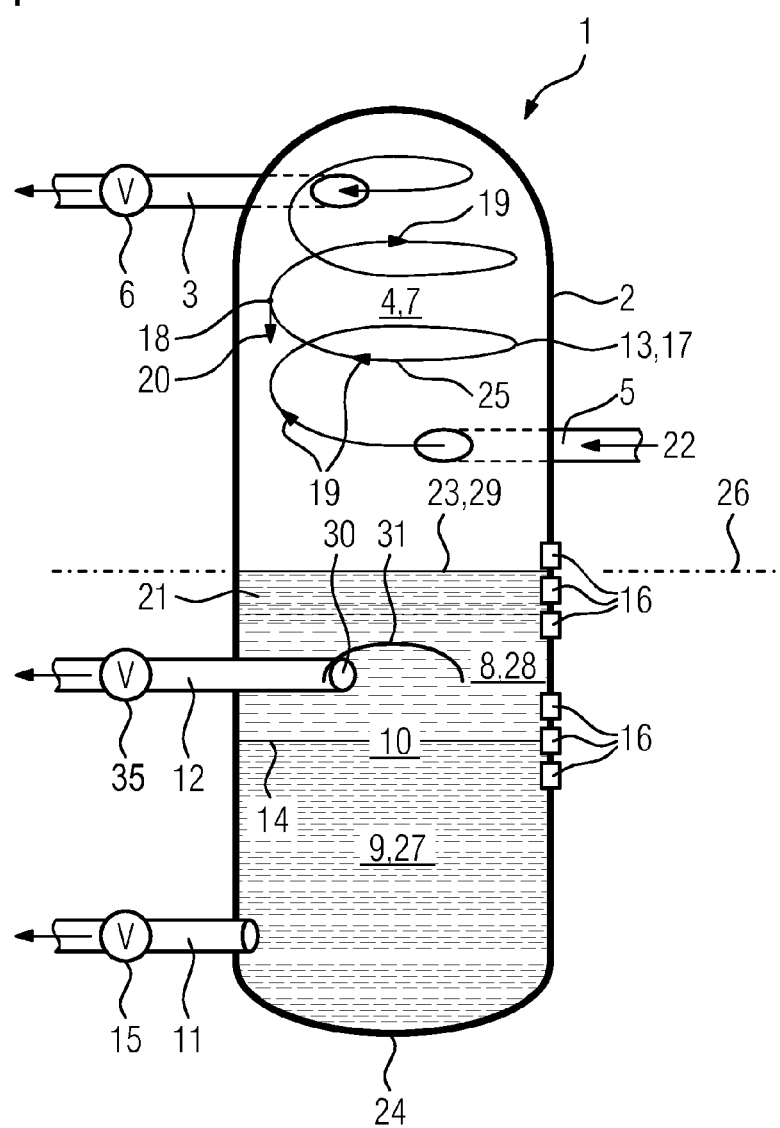
FIG. 1 shows a filtrate separator in accordance with an example embodiment.

Some embodiments provide a device and a method for phase separation of the multiphase mixture which make a high level of purity of the separated phases possible and which are simple and low-cost to realize and also which make possible in an efficient and effective manner the phase separation of multiphase mixtures, especially such a mixture with a least three mixed phases, specifically with a gas phase and at least two fluid phases. Some embodiments may facilitate separation of high volume flows of multiphase mixtures.

Some embodiments provide a device and a method for phase separation of a multiphase mixture with the features in accordance with the respective independent claim.

Phase mixtures comprising at least one gaseous and at least two fluid phases are to be understood here as phase mixtures.

Such multiphase mixtures, especially these three-phase mixtures comprising one gas and two fluid phases, can for example occur in a—combined—washing and steam (pressure) filtration of oil sand as a cake-forming, washing and dehumidification filtrate, also referred to in short below simply as filtrate.

In such cases, i.e., in this combined washing and steam (pressure) filtration of oil sand, two non-mixable fluids are used, which are to be found again in the fluid mixture in the filtrate. The source of the non-mixable fluids are parent fluid or parent filtrate, wash fluid and condensate. The resulting three-phase mixture (fluid mixture-gas mixture) in the filtrate then comprises an organic solvent with bitumen and a water—not mixable with the organic solvent with bitumen—(together abbreviated to the fluid component) as well as air (gas component).

However disclosed embodiments are not restricted to this specific three-phase mixture, but can be used or any given multiphase mixture with at least two—or even more—fluid phases or for their phase separation.

The device disclosed herein for phase separation of a multiphase mixture has a vessel, especially in the form of a cylindrical container extending in a vertical direction, with correspondingly positioned inlet for the multiphase mixture and correspondingly positioned outlets for draining off a respective phase of the multiphase mixture in each case, especially—in the case of a three-phase mixture with one gas and two fluid phases—for draining off the at least one gas phase and the at least two fluid phases.

In some embodiments this vessel possesses a tangential inlet, especially a tangential (inlet) nozzle, via which the multiphase mixture, i.e. the mixture of fluid component and gas component or the fluid mixture-gas mixture can enter the vessel tangentially.

In this case the terms tangential or tangential entry or tangential exit should be understood to mean that the multiphase mixture enters the vessel or exits from it along a circumferential contour of the latter.

Also in some embodiments the vessel possesses at least three outlets, via which the separated phase of the multiphase mixture, i.e. the at least one gas phase and the at least two fluid phases, can be drained off separately.

In the vertical direction above the tangential inlet, especially close to or directly at an upper end of the vessel, the vessel has the first of these outlets, namely a gas outlet, via which the gaseous phase—separated from the multiphase gas mixture—or the gas forming the gas phase—can be drained off from the vessel.

This gas outlet—like the tangential inlet—is also embodied as a tangential outlet, especially as a tangential (outlet) nozzle, in order—in collaboration with the tangential inlet—with a tangential inlet and outlet, to cause a defined eddying of the multiphase mixture entering the vessel or between inlet and gas outlet.

The positioning of the multiphase gas mixture inlet and/or of the gas outlet provided, i.e. the gas outlet positioned embodied tangentially vertically above the tangential entry—in other words—the respective tangential inlet or outlet at different vertical heights in the vessel—means that the multiphase mixture in the vessel is forced in an upwards circular path in the direction of the gas outlet and through this the eddy flow or vortex is induced.

The multiphase mixture flows upwards in the upwards-directed eddy in the direction of the gas outlet, whereby through a centrifugal or gravitational force effect the fluid mixing or the fluid component, specifically in the form of droplets of fluid, is separated out from the multiphase mixture.

These separated-out drops of fluid sink down under the force of gravity in the vessel and are collected in a lower area of the vessel (fluid part of the vessel or fluid area).

There the phases of the fluid phases of the collecting or collected fluid mixture are separated by the influence of gravity.

The "multiphase gas mixture" reduced by the drops of fluid—rising upwards during the eddying, i.e. the gas precipitated out from the multiphase mixture or the separated gas phase, collects in an upper area of the vessel (gas area of the vessel) and can be drained off from the vessel there via the gas outlet, especially by means of vacuum pump.

In the fluid space of the vessel the fluid mixture collecting or collected there will form the at least two separated fluid phases, which has its basis in their different specific weights or densities.

A specifically heavy fluid, especially water or inhomogeneous water mixture, is deposited—as the first fluid phase, especially water phase—in a lower area of the vessel. A specifically lighter fluid not mixable with the specifically heavy fluid, especially a fluid containing an organic solvent such as toluol and bitumen, floats on this—as the second fluid phase especially oil phase.

These at least two fluid phases separating themselves or separated in this way can be drained from the vessel via the correspondingly positioned two further outlets in addition to the gas extraction outlet, namely via a second and a third outlet.

For this purpose, in some embodiments, in the vertical direction below the tangential inlet on the vessel—at a vertically different height and one adapted or corresponding to the respective fluid phase—the second outlet, via which the second fluid phase can be drained off, and—below the second outlet—the third outlet, by which the first fluid phase can be drained off, are arranged. In other words, the second, specifically lighter fluid can be drained off via the second outlet disposed vertically above the third outlet and the first specifically heavier fluid can be drained off by the third outlet disposed below the second outlet.

The same naturally also applies to three or more specific non-mixable fluids of different weights from the multiphase mixture, for which a corresponding number of outlets is to be provided.

In some embodiments of the method the phase separation of such a multiphase mixture of at least one gas (gas component) and at least two fluid phases (fluid component), using the device an upwards-directed eddy flow is imparted to the multiphase mixture.

As the mixture flows through the upwards-directed eddies the influence of centrifugal and gravitational forces causes drops of fluid to be separated out from the multiphase mixture, through which the fluid component is separated out or separated from the multiphase mixture. The multiphase mixture is reduced during this process to gas or to the gas phase, i.e. the gas phase is formed.

The drops of fluid are collected, wherein the collected drops of fluid form the first and the second fluid phase under the influence of gravitational forces.

All phases formed are drained off separately from one another, which separates the multiphase mixture. I.e. the two fluid phases embodied and the gas phase are each drained off separately and this separates the multiphase mixture.

Viewed in clear terms, embodiments disclosed herein may thus use basic, easy-to-use physical effects, i.e. centrifugal force and gravitational force, in order to separate multiphase mixtures, using the effects of said forces into the individual phases in a simple manner.

Because of these easy-to-use physical effects a device for phase separation of a multiphase mixture that is simple and can be implemented at low cost and thereby can divide up the multiphase mixture in a simple but efficient and effective manner with high purity. Another achievement of certain embodiments is that a separation especially of high volume flows in multiphase mixtures is possible.

In one embodiment the vessel is a pressurized vessel, the pressurization of which is adapted or designed in accordance with a pressurized multiphase mixture entering the vessel—for phase separation. In such cases the multiphase mixture can be a filtrate from a drum, disk, pan, band filter or another continuous filter, especially a steam (pressure) filter.

In one development the tangential inlet is embodied as an input nozzle. This enables the multiphase mixture to arrive in the vessel with as little pressure loss as possible. I.e., the inlet may be designed for minimum pressure loss. In addition such a tangential inlet nozzle may facilitate the formation of the eddy flow.

Furthermore, in one development there can be provision for the inlet to be provided with a drip separator, which separates drops of fluid from the multiphase mixture before it enters the vessel. The result of this is that the multiphase mixture does not reach the vessel in the form of vapor or as spray, which facilitates the phase separation.

There can also be provision for the multiphase mixture to be conveyed as an overall flow, especially of a filter, or as part flows, especially from a process area of the filter, into the vessel through the tangential inlet, especially through the tangential nozzle.

Furthermore there can also be provision for the inlet to be disposed at a predeterminable vertical distance from a fluid surface of the fluid component of the multiphase mixture collected in the vessel. In particular there can be provision here for the inlet to be disposed above the center of the vessel, especially at approx. ⅔ of the height of the vessel.

In a further development there is provision for the gas outlet to be embodied as a tangential (outlet) nozzle. This enables the gas phase or the gas to leave the vessel with the lowest possible pressure loss. I.e. the gas outlet—and also the inlet—may be designed for minimum pressure loss.

Above and beyond this such a tangential (outlet) nozzle may facilitate the formation of the eddy flow. Expressed in simple terms, the draining out of the gas phase is also tangential in order to create a defined eddy flow in the gas area of the vessel.

In a further embodiment there is provision for the gas outlet to be accommodated vertically above the inlet and also vertically well above the surface of the fluid in the vessel.

In addition, the gas phase or the gas may be the drained out of the vessel by means of vacuum pump. This facilitates the separation of the gas phase from the multiphase mixture.

In one development there is provision for the third outlet, i.e., the outlet for the first specifically heavier fluid, to be positioned in a lower quarter of the vessel, especially in an area close to a floor of the vessel. The result of this is that the first specifically heavier fluid can be drained off with a high purity.

The reasons of simplicity the third outlet can be embodied as a drain nozzle.

There can also be provision for the outlet of the first fluid phase or of the first fluid to be embodied by means of the drain pump, especially by means of a regulated drain pump.

There can also be provision for the vessel to have a curved floor, especially a torispherical head or deep dished torispherical floor, in order to collect the solids and/or particles, for example from a suspended sediment. The third outlet may then be positioned vertically above the floor.

In a further development there is provision for the second outlet, i.e. the outlet for the second, specifically lighter fluid, to be positioned in a lower half of the specifically lighter fluid layer, especially in the lower third of the specifically lighter fluid layer.

The specifically lighter fluid of the fluid mixture—in the case of two non-mixable fluids—is positioned namely in the vessel between the gas phase and the specifically heavier fluid. An overall volume flow of specifically heavier fluid must be transported through this layer of the specifically lighter fluid. In the area of the phase boundary to the gas phase, at which the two fluids are separated, a clear mixing is expected. Thus the positioning of the second outlet as provided may enable the second fluid to be drained off with high purity.

The purity of the second fluid drained off can be further increased if the second outlet, for example also a nozzle, is extended into the vessel, so that the draining off of the second fluid phase is undertaken from a central coordinate of the second fluid.

Extended "into" can be understood here in the case of the cylindrical vessels as "radially inwards". In the case of a straight wall of the vessel, extended "inwards" can be understood as an extension aligned perpendicular to the wall.

Further, a cover, especially similar to a dome or bell, may be disposed above an opening of the second outlet, especially above a nozzle opening. The effect of such a cover open at the bottom is that the second fluid phase or the second fluid is only drained off from below the outlet opening and thus a higher purity of the second specifically lighter fluid drained off is achieved.

There can also be provision for undertaking the draining off of the second fluid by means of a drain pump, especially by means of a regulated drain pump.

The phase separation of the multiphase can be improved, i.e., an error factor during separation of the multiphase mixture can be reduced, if the draining off of the at least two fluid phases or fluid is a regulated process. If for example the draining off of the fluids is realized by drain pumps, it may be advantageous to regulate the pumping out rate of the fluids or of the drain pumps.

For this purpose it can also be expedient to position measurement sensors—for a detection of a phase boundary—in the area of the respective target layers of the phase boundaries, which layers each define minimum, optimum and maximum position of the phase boundary in order, via the regulation of the draining off, to always keep the phase boundary at its optimum.

Conductivity sensors, especially electrical or thermal conductivity sensors, capacitive sensors and/or optical sensors can be used as sensors.

Some embodiments can be used for a multiphase mixture of a combined—washing and steam (pressure) filtration of oil sand, for example for a cake-forming, washing and dehumidifying filtrate. In this case this filtrate features a mixture of an organic solvent with bitumen and a water—not mixable with the solvent with bitumen—(fluid component with first and second fluid phase or water and oil phase) as well as air (gas phase).

Since the water is the specifically heavier fluid by comparison with the organic solvent, the water phase will form below the oil phase and can be drained off via the third outlet. The oil phase can be drained off via the second outlet, the gas phase is drained off via the gas outlet.

Some embodiments may be used in drum, disk, and, band filters or further continuous filters in order to process the filtrate occurring continuously there, i.e., the multiphase mixture, directly and continuously by separation as disclosed herein.

In particular there can be provision for separation products, i.e., the at least one gas or the at least two fluids, to be reused during the phase separation of the multiphase mixture with high purity.

FIG. 1 shows a filtrate separator 1 for phase separation of a cake-forming washing and dehumidifying filtrate 22 of a continuous steam filter apparatus, as is used for example in the steam (pressure) filtration of oil sand.

For a simultaneous washing and steam (pressure) filtration by such a steam filter apparatus, for example in the form of a rotary filter, two non-mixable fluids are used, which are found again as a fluid mixture in the filtrate 22. The source of the non-mixable fluids are parent fluid or parent filtrate, wash fluid and condensate.

In the filtrate separator 1 of the steam filter apparatus it will thus—with a filtrate 22—result in a multiphase or three-phase mixture 22 of fluid mixture on the one hand and air on the other hand.

In the case of the steam (pressure) filtration of oil sand the filtrate will thus be composed of a three-phase mixture comprising a fluid component of an organic solvent such as toluol and bitumen, a further fluid component comprising water and also a gas component.

This filtrate 22 is conveyed to the filtrate separator 1 and separated there.

The filtrate separator 1 is composed, as shown in FIG. 1 of a central container or vessel 2 with correspondingly positioned inlet 5 and outlet nozzles 3, 11, 12.

As FIG. 1 shows, the vessel 2 of the filtrate separator 1 has an inlet nozzle 5 above the center 26 of the vessel 2, here at appr. ⅔ of the height of the vessel 2. Through this inlet nozzle 5 the filtrate 22, is conveyed as an overall flow of the filter of the steam filter apparatus or as part flows from a process area of the filter of the steam filter apparatus into the vessel 2 of the filtrate separator 1.

The inlet nozzle 5 is embodied as a tangential nozzle 5 with a pressure loss that is as low as possible and is combined with a droplet separator (not shown).

Above the inlet nozzle 5 and clearly above the fluid level 23 in the filtrate separator 1 the—likewise designed for minimum pressure loss—tangential outlet nozzle 3 or gas outlet 3 for the (separated) gas phase 7 of the three-phase mixture 22 is attached.

The draining off of the gas phase 7 likewise occurs tangentially in order to create a defined eddy 13 in the gas area 4 of the filter separator 1.

Through the positioning of the tangential outlet nozzle 3 for the gas phase 7 vertically above the tangential inlet nozzle 5, the three-phase mixture 22 entering the vessel 2 is forced into an upwards circular path 25 aligned in the direction of the outflow nozzle or gas outflow 3 and thereby the eddy flow or vortex 17 is induced.

Figure 3:
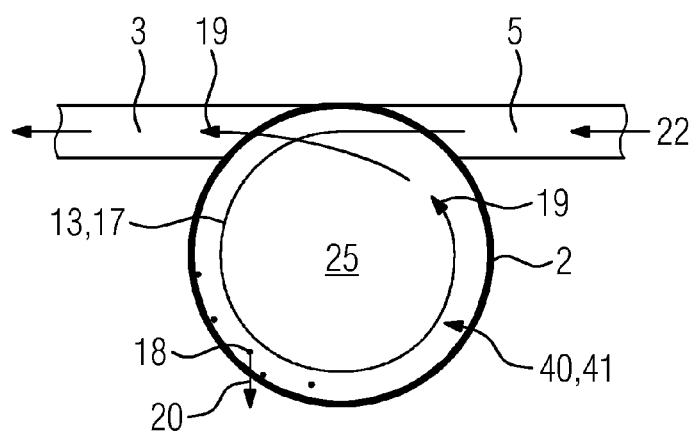
FIG. 3 shows a basic diagram of a separation of droplets of fluid from a multiphase mixture in accordance with an example embodiment.

FIG. 3 shows a basic schematic diagram of a section of this eddy flow 13 in the vessel 2.

The three-phase mixture 22 flows—as is illustrated in FIGS. 1 and 3—on entry into the vessel 2 via the tangential inlet nozzle 5 in the upwards-directed eddy flow 13 in direction 19 of the gas outlet 3 upwards to the gas outlet 3, wherein through a centrifugal gravitational force effect, the fluid mixture 18 in the form of fluid droplets 18 is separated out or separated 20 from the multiphase mixture 22.

The separated-out fluid droplets 18 sink under gravitational force in the vessel 2 and are collected in a lower area of the vessel 2, i.e. in the fluid area 10 of the vessel.

The "three-phase mixture" reduced by the fluid droplets 18—rising upwards during the upwards rise in eddies, i.e. the gas separated out of the three-phase mixture 22 or the separated gas phase 7, collects in an upper area of the vessel 2, i.e. in the gas area 4 of the vessel 2, and is drained off there from the vessel 2 via the gas outlet 3 by means of a vacuum pump 6.

In the fluid area 10 of the filtrate separator 1 the phases of the non-mixable fluids involved are separated.

The specifically heavier, non-mixable fluid 27, here water 27, is deposited here as the first fluid phase 9 or water phase 9; the specifically lighter, non-mixable fluid 28, here the organic solvent with bitumen 28, floats on the latter, here as the second fluid phase 8 or oil phase 8.

As FIG. 1 shows, the outlet nozzle 11 for the specifically heavier fluid 27 is positioned in the lower quarter of the filtrate separator 1, e.g., in the area close to the filtrate separator floor 24. The specifically heavier fluid 27 is drained off by means of a drainage pump 15 combined with the outlet nozzle 11.

The specifically lighter fluid 28 positions itself in the filtrate separator 1 between gas phase 7 and specifically heavier fluid 27 or the water phase 9, whereby the entire volume flow of specifically heavier fluid 27 must be transported through this layer 8.

In the area of the phase boundary 29 to the gas phase 7, at which the two fluids 27, 28 are separated, a clear mixing (mixing area 21) of specifically lighter 28 and specifically heavier 27 fluid is expected.

The outlet nozzle 12 for the specifically lighter fluid 28 is positioned for this reason in the lower half of the specifically lighter fluid layer 8, e.g., as FIG. 1 shows, in the lower third of this layer 8.

The outlet nozzle 12 for the specifically lighter fluid 28 is, as FIG. 1 shows, extended in the vessel 2 of the filtrate separator 1 so that the draining off of the specifically lighter fluid 28 is undertaken from its central coordinates. Disposed above an outlet opening 30 of this outlet nozzle 12 for the specifically lighter fluid 28 is a cover 31 in the form of a dome 31 which leads to the specifically lighter fluid 28 only being drained off from below the outlet opening 30.

A higher purity of the drawn-off specifically lighter fluid 28 is achieved by this. The drawing-off of the specifically lighter fluid 28 is likewise undertaken by means of a drain pump 35 combined with the outlet nozzle 12.

The fluids 27, 28 separated in this way are drained off, like the draining off of the gas phase 7 controlled by means of the drain pump 15 or the vacuum pump 6, by which a continuous operation of the filtrate separator 1 can be guaranteed.

For this purpose measurement sensors 16 are disposed in the vessel 2 of the filtrate separator 1 in the area of the desired phase boundaries 14, 29 in each case, which each define a minimum, optimum and maximum position of the respective phase boundary 14, 29. Electrical conductivity sensors 16 are used as measurement sensors 16 here.

The draining off of the fluids 27, 28 is regulated such that—for a correspondingly drained-off fluid quantity of the respective fluid 27, 28—the corresponding phase boundary 14, 29 is always held at or set to its optimum level.

Figure 2:
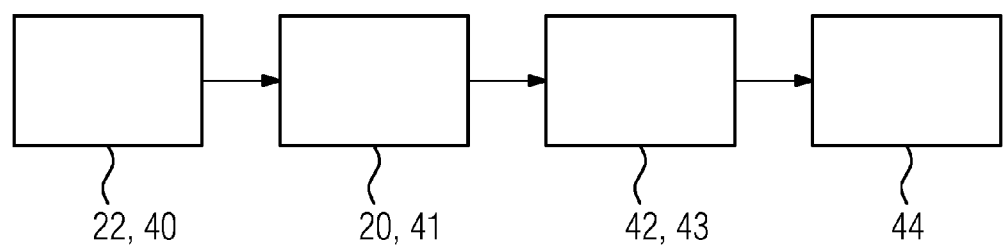
FIG. 2 shows an example method for phase separation of a cake-forming washing and dehumidifying filtrate of a continuous steam filter apparatus.

FIG. 2 illustrates in detail individual steps or phases, as are executed during phase separation of the multiphase mixture or of the cake-forming, washing and dehumidifying filtrate 22.

Thus FIG. 2 illustrates how the multiphase mixture 22 has an upwards-directed eddy flow 13 imparted to it 40, wherein on flowing through 19 upwards-directed eddies 17 of the eddy flow 13 the fluid droplets 18 are separated out 20 from the multiphase mixture 22 and during this process the separated gas phase 7 of the multiphase mixture is formed 41.

The fluid droplets 18 are collected 42, wherein a first and second fluid phase 8, 9 are formed 43 for the collected fluid droplets under the influence of gravity.

All phases 7, 8, 9 are taken away 44 separately from one another, through which the multiphase mixture 22 is separated.

Although the invention has been illustrated and described in greater detail by the example embodiments, the invention is not restricted by the disclosed examples and other variations can be derived herefrom by the person skilled in the art without departing from the scope of protection of the invention.

What is claimed is:

1. A device for phase separation of a multiphase mixture with at least one gas and at least two fluid phases, comprising:
   a vessel comprising:
      a tangential inlet via which the multiphase mixture is able to be conveyed into the vessel,
      a tangential gas outlet located immediately above the inlet, by which a gas phase of the multiphase mixture separated from the multiphase mixture is able to be taken away from the vessel, and
      at least two outlets disposed vertically below the inlet, via which at least one of the two fluid phases of the multiphase mixture separated from the multiphase mixture is able to be taken away from the vessel.

2. The device for phase separation of a multiphase mixture of claim 1, wherein at least one of the tangential inlet and the gas outlet is embodied as a tangential nozzle.

3. The device for phase separation of a multiphase mixture of claim 1, wherein the inlet is positioned above the center of the vessel at approximately ⅔ the height of the vessel.

4. The device for phase separation of a multiphase mixture of claim 1, wherein the inlet is combined with a droplet separator.

5. The device for phase separation of a multiphase mixture of claim 1, wherein the gas outlet is disposed close to or directly at an upper end of the vessel.

6. The device for phase separation of a multiphase mixture of claim 1, wherein the gas outlet is combined with a vacuum pump configured to remove the gas phase from the vessel.

7. The device for phase separation of a multiphase mixture of claim 1, wherein the device is configured for phase separation of a multiphase mixture, which has two fluid phases that are formed by non-mixable, specifically different weights of fluid.

8. The device for phase separation of a multiphase mixture of claim 7, wherein an outlet for the specifically heavier fluid is positioned in a lower quarter of the vessel, and an outlet for the specifically lighter fluid is positioned in a lower half of a fluid layer embodied by the specifically lighter fluid in the vessel.

9. The device for phase separation of a multiphase mixture of claim 1, wherein the vessel has a torispherical head or a deep dished torispherical floor.

10. The device for phase separation of a multiphase mixture of claim 1, wherein an outlet has a drain pump configured to remove a fluid phase.

11. The device for phase separation of a multiphase mixture of claim 1, wherein an outlet is a nozzle extended radially into the vessel, the outlet having an outlet opening including a cover.

12. The device for phase separation of a multiphase mixture of claim 1, wherein the device is configured for phase separation of a model three-phase mixture with at least two fluid phases and a gas phase, wherein one of the at least two fluid phases is a fluid comprising organic solvent and bitumen.

13. The device for phase separation of a multiphase mixture of claim 12, wherein a further of the at least two fluid phases is a fluid comprising water.

14. The device for phase separation of a multiphase mixture of claim 1, wherein the vessel comprises measurement sensors configured to detect a phase boundary, wherein the measurement sensors are positioned in the area of a minimum, optimum and maximum position of the phase boundary.

15. The device for phase separation of a multiphase mixture of claim 1, the device being configured to regulate the draining off of the at least two fluid phases of the separated multiphase mixture from the vessel, wherein during the regulation the device is configured to at least one of (a) set at least one phase boundary between two phases of the multiphase mixture separated in the vessel and (b) hold the at least one phase boundary at a predeterminable level.

16. The device for phase separation of a multiphase mixture of claim 1, wherein the device is configured for simultaneous washing and steam filtration of oil sand for phase separation of the cake-forming, washing and dehumidifying filtrate formed in such cases, wherein the cake-forming, washing and dehumidifying filtrate formed in such cases is separated as a multiphase mixture by means of the device for phase separation of a multiphase mixture.

17. A method for phase separation of a multiphase mixture with at least one gas and at least two fluid phases using a device having a vessel comprising
a tangential inlet via which the multiphase mixture is able to be conveyed into the vessel, a tangential gas outlet located immediately above the inlet, by which a gas phase of the multiphase mixture separated from the multiphase mixture is able to be taken away from the vessel, and at least two outlets disposed vertically below the inlet, via which at least one of the two fluid phases of the multiphase mixture separated from the multiphase mixture is able to be taken away from the vessel, the method comprising:
imparting an upwards-directed eddy flow to the multiphase mixture,
during the through flow of upwards-directed eddies of the eddy flow, separating fluid droplets out from the multiphase gas mixture and upon completion the separated gas phase of the multiphase mixture is formed,
collecting the fluid droplets, wherein a first and a second fluid phase form in the collected fluid droplets under the influence of gravity,
removing, separated from one another, all phases formed, such that the multiphase mixture is thereby separated.

18. The method for phase separation of a multiphase mixture of claim 17, wherein the method is used for phase separation of a filtrate from a drum, disk, pan or band filter, or from another continuous filter.

19. The method the phase separation of a multiphase mixture of claim 17, wherein the method is used for phase separation of a cake-forming, washing and dehumidifying filtrate in a continuous steam filter apparatus.

20. The method the phase separation of a multiphase mixture of claim 17, wherein the method is used for phase separation of a filtrate with at least one gas phase, and at least one first, heavier fluid phase, and a second, lighter fluid phase.

* * * * *